United States Patent
Wang et al.

(10) Patent No.: US 10,868,654 B2
(45) Date of Patent: Dec. 15, 2020

(54) CUSTOMIZING TRANSMISSION OF A SYSTEM INFORMATION MESSAGE

(71) Applicant: Google LLC, Mountain View, CA (US)

(72) Inventors: Jibing Wang, Saratoga, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 62 days.

(21) Appl. No.: 16/105,948

(22) Filed: Aug. 20, 2018

(65) Prior Publication Data

US 2019/0190676 A1 Jun. 20, 2019

Related U.S. Application Data

(60) Provisional application No. 62/599,500, filed on Dec. 15, 2017.

(51) Int. Cl.
*H04B 7/06* (2006.01)
*H04L 5/00* (2006.01)
(Continued)

(52) U.S. Cl.
CPC ......... *H04L 5/0053* (2013.01); *H04B 7/0617* (2013.01); *H04L 27/00* (2013.01);
(Continued)

(58) Field of Classification Search
None
See application file for complete search history.

(56) References Cited

U.S. PATENT DOCUMENTS

| 5,543,811 A | 8/1996 | Chethik |
| 6,711,224 B1 | 3/2004 | Benning et al. |

(Continued)

FOREIGN PATENT DOCUMENTS

| EP | 3081041 | 10/2016 |
| EP | 3105958 | 12/2016 |

(Continued)

OTHER PUBLICATIONS

"Final Office Action", U.S. Appl. No. 15/842,318, dated Jul. 10, 2019, 15 Pages.
(Continued)

*Primary Examiner* — Jenkey Van
(74) *Attorney, Agent, or Firm* — Colby Nipper PLLC

(57) ABSTRACT

Techniques and apparatuses are described that enable customized transmission of a system information message. One or more transmission characteristics of the system information message are tailored for a particular user equipment (UE) device or a group of UE devices. In one aspect, a response frequency used to transmit the system information message is customized based on a requested frequency of the UE device. In another aspect, a beamform pattern used to transmit the system information message is customized based on an angle to the UE device. In general, these customizations increase an amplitude of the system information message at the UE device, which increases an effective range of the system information message and enables a larger quantity of UE devices to establish communication with a base station. The customization also enables the base station to efficiently transmit the system information message to one or more UE devices.

20 Claims, 6 Drawing Sheets

(51) Int. Cl.
*H04W 4/08* (2009.01)
*H04W 52/02* (2009.01)
*H04W 48/10* (2009.01)
*H04L 27/00* (2006.01)
*H04W 72/04* (2009.01)
*H04W 88/02* (2009.01)
*H04W 88/08* (2009.01)

(52) U.S. Cl.
CPC .............. *H04W 4/08* (2013.01); *H04W 48/10* (2013.01); *H04W 52/0219* (2013.01); *H04W 72/046* (2013.01); *H04L 5/0048* (2013.01); *H04W 88/02* (2013.01); *H04W 88/08* (2013.01)

(56) References Cited

U.S. PATENT DOCUMENTS

| | | |
|---|---|---|
| 8,315,185 B2 | 11/2012 | Chan |
| 8,346,286 B2 | 1/2013 | Lee et al. |
| 8,543,063 B2 | 9/2013 | Bergel et al. |
| 8,594,053 B2 | 11/2013 | Kim et al. |
| 8,605,644 B2 | 12/2013 | Wang |
| 8,774,150 B1 | 7/2014 | Jeffery et al. |
| 9,060,324 B1 | 6/2015 | Goyal et al. |
| 9,204,441 B2 | 12/2015 | Nagaraja et al. |
| 9,253,766 B2 | 2/2016 | Yang et al. |
| 9,258,798 B2 | 2/2016 | Li et al. |
| 9,271,290 B2 | 2/2016 | Pelletier et al. |
| 9,414,430 B2 | 8/2016 | Vajapeyam et al. |
| 9,425,923 B2 | 8/2016 | Ratasuk et al. |
| 9,686,667 B2 | 6/2017 | Artuso |
| 9,900,133 B2 | 2/2018 | Lu et al. |
| 10,148,329 B2 | 12/2018 | Yue et al. |
| 10,375,671 B2 | 8/2019 | Stauffer et al. |
| 10,608,721 B2 | 3/2020 | Wang et al. |
| 10,779,303 B2 | 9/2020 | Wang et al. |
| 2005/0047322 A1* | 3/2005 | Sondur ............ H04L 25/0226 370/203 |
| 2007/0018630 A1 | 1/2007 | Oehm |
| 2008/0018427 A1 | 1/2008 | Ezra et al. |
| 2009/0102715 A1 | 4/2009 | Lou et al. |
| 2009/0180451 A1 | 7/2009 | Alpert et al. |
| 2010/0194650 A1* | 8/2010 | Goransson ........... H04B 7/0452 343/703 |
| 2011/0002373 A1 | 1/2011 | Jeon |
| 2011/0205981 A1 | 8/2011 | Koo et al. |
| 2012/0039280 A1 | 2/2012 | Chen et al. |
| 2012/0140743 A1 | 6/2012 | Pelletier et al. |
| 2012/0208547 A1 | 8/2012 | Geirhofer et al. |
| 2012/0275384 A1 | 11/2012 | Long et al. |
| 2013/0012141 A1 | 1/2013 | Harnishfeger |
| 2013/0301454 A1 | 11/2013 | Seol et al. |
| 2014/0146732 A1 | 5/2014 | Olufunmilola et al. |
| 2014/0148107 A1 | 5/2014 | Maltsev et al. |
| 2014/0362752 A1 | 12/2014 | Jha et al. |
| 2015/0208458 A1 | 7/2015 | Pelletier et al. |
| 2015/0289147 A1 | 10/2015 | Lou et al. |
| 2015/0349741 A1 | 12/2015 | Lehtola et al. |
| 2015/0382205 A1 | 12/2015 | Lee et al. |
| 2016/0029235 A1 | 1/2016 | Kim et al. |
| 2016/0050002 A1 | 2/2016 | Wei et al. |
| 2016/0072564 A1 | 3/2016 | Li et al. |
| 2016/0076945 A1 | 3/2016 | Huang et al. |
| 2016/0099763 A1 | 4/2016 | Chen |
| 2016/0135213 A1 | 5/2016 | Zhu et al. |
| 2016/0179124 A1 | 6/2016 | Madan et al. |
| 2016/0205679 A1 | 7/2016 | Yoo et al. |
| 2016/0226640 A1 | 8/2016 | Seol et al. |
| 2016/0234736 A1 | 8/2016 | Kubota et al. |
| 2016/0270027 A1 | 9/2016 | Ang et al. |
| 2016/0277225 A1 | 9/2016 | Frenne et al. |
| 2016/0286524 A1 | 9/2016 | Griot et al. |
| 2016/0294531 A1 | 10/2016 | Loehr et al. |
| 2016/0353424 A1 | 12/2016 | Stirling-Gallacher et al. |
| 2017/0026293 A1 | 1/2017 | Desclos et al. |
| 2017/0026962 A1 | 1/2017 | Liu et al. |
| 2017/0104561 A1 | 4/2017 | Agardh et al. |
| 2017/0134913 A1 | 5/2017 | Cui et al. |
| 2017/0149480 A1 | 5/2017 | Kakishima et al. |
| 2017/0180095 A1 | 6/2017 | Xue et al. |
| 2017/0195031 A1 | 7/2017 | Onggosanusi et al. |
| 2017/0201982 A1 | 7/2017 | Alvarino et al. |
| 2017/0208589 A1 | 7/2017 | Majjigi et al. |
| 2017/0223744 A1 | 8/2017 | Qian et al. |
| 2017/0257842 A1 | 9/2017 | Hessler et al. |
| 2017/0310417 A1 | 10/2017 | Jung et al. |
| 2017/0311285 A1* | 10/2017 | Ly ................... H04W 74/0833 |
| 2017/0331577 A1 | 11/2017 | Parkvall et al. |
| 2017/0331670 A1 | 11/2017 | Parkvall et al. |
| 2017/0347334 A1 | 11/2017 | Akkarakaran et al. |
| 2017/0367046 A1 | 12/2017 | Papasakellariou |
| 2017/0367069 A1 | 12/2017 | Agiwal |
| 2017/0374579 A1 | 12/2017 | Wang et al. |
| 2018/0020462 A1 | 1/2018 | Xiong et al. |
| 2018/0077612 A1* | 3/2018 | Zheng ................. H04W 76/27 |
| 2018/0077734 A1 | 3/2018 | Kim et al. |
| 2018/0109353 A1 | 4/2018 | Kwak et al. |
| 2018/0139014 A1 | 5/2018 | Xiong et al. |
| 2018/0139701 A1 | 5/2018 | Want et al. |
| 2018/0191415 A1 | 7/2018 | Aryafar et al. |
| 2018/0206217 A1 | 7/2018 | Martin et al. |
| 2018/0213529 A1 | 7/2018 | Lee et al. |
| 2018/0227902 A1 | 8/2018 | Gholmieh et al. |
| 2018/0227960 A1 | 8/2018 | Belghoul et al. |
| 2018/0242160 A1* | 8/2018 | Morita .................. H04W 16/08 |
| 2018/0279303 A1 | 9/2018 | Sun et al. |
| 2018/0332605 A1 | 11/2018 | Pelletier |
| 2018/0343043 A1 | 11/2018 | Hakola et al. |
| 2018/0367230 A1 | 12/2018 | Su et al. |
| 2019/0007844 A1 | 1/2019 | Müller et al. |
| 2019/0037560 A1 | 1/2019 | Huang et al. |
| 2019/0037586 A1 | 1/2019 | Park et al. |
| 2019/0052419 A1 | 2/2019 | Yang et al. |
| 2019/0058516 A1 | 2/2019 | Yang et al. |
| 2019/0069321 A1 | 2/2019 | Akkarakaran et al. |
| 2019/0089436 A1 | 3/2019 | Wei et al. |
| 2019/0089506 A1 | 3/2019 | Takeda et al. |
| 2019/0123798 A1 | 4/2019 | Lou et al. |
| 2019/0132830 A1 | 5/2019 | Tabet et al. |
| 2019/0141767 A1 | 5/2019 | Wang et al. |
| 2019/0159140 A1 | 5/2019 | Wang et al. |
| 2019/0173626 A1 | 6/2019 | Wang et al. |
| 2019/0174433 A1 | 6/2019 | Nory et al. |
| 2019/0182850 A1 | 6/2019 | Wang et al. |
| 2019/0190577 A1 | 6/2019 | Wang et al. |
| 2019/0190641 A1 | 6/2019 | Wang et al. |
| 2019/0191440 A1 | 6/2019 | Wang et al. |
| 2019/0200322 A1 | 6/2019 | Wang et al. |
| 2019/0229789 A1 | 7/2019 | Zhang et al. |
| 2019/0230603 A1 | 7/2019 | Liu et al. |
| 2019/0230607 A1 | 7/2019 | Chung et al. |
| 2019/0239168 A1 | 8/2019 | Li et al. |
| 2019/0261380 A1 | 8/2019 | Iyer et al. |
| 2019/0288809 A1 | 9/2019 | Iyer et al. |
| 2019/0306830 A1 | 10/2019 | Wang et al. |
| 2019/0342825 A1* | 11/2019 | Liu ...................... H04W 56/001 |
| 2019/0349968 A1 | 11/2019 | Yerramalli et al. |
| 2019/0356368 A1 | 11/2019 | Liu et al. |
| 2019/0380140 A1 | 12/2019 | Wong et al. |
| 2020/0028745 A1 | 1/2020 | Parkvall et al. |
| 2020/0275424 A1 | 8/2020 | Wang et al. |

FOREIGN PATENT DOCUMENTS

| | | |
|---|---|---|
| EP | 3123802 | 2/2017 |
| EP | 3443704 | 2/2019 |
| WO | 2013070149 | 5/2013 |
| WO | 2015086215 | 6/2015 |
| WO | 2012074878 | 7/2015 |
| WO | 2016119882 | 8/2016 |
| WO | 2016133106 | 8/2016 |
| WO | 2016204811 | 12/2016 |
| WO | 2017011802 | 1/2017 |

(56) References Cited

FOREIGN PATENT DOCUMENTS

| WO | 2017025366 | 2/2017 |
|---|---|---|
| WO | 2017030601 | 2/2017 |
| WO | 2017083514 | 5/2017 |
| WO | 2017088898 | 6/2017 |
| WO | 2017109549 | 6/2017 |
| WO | 2017111987 | 6/2017 |
| WO | 2017117340 | 7/2017 |
| WO | 2017127126 | 7/2017 |
| WO | 2017146773 | 8/2017 |
| WO | 2017150863 | 9/2017 |
| WO | 2017195463 | 11/2017 |
| WO | 2017196243 | 11/2017 |
| WO | 2018031846 | 2/2018 |
| WO | 2018034998 | 2/2018 |
| WO | 2018064068 | 4/2018 |
| WO | 2019094078 | 5/2019 |
| WO | 2019112648 | 6/2019 |
| WO | 2019118021 | 6/2019 |
| WO | 2019118023 | 6/2019 |
| WO | 2019118787 | 6/2019 |
| WO | 2019118915 | 6/2019 |
| WO | 2019126791 | 6/2019 |
| WO | 2019193768 | 10/2019 |

OTHER PUBLICATIONS

"International Search Report and Written Opinion", PCT Application No. PCT/US2018/065829, dated Jun. 18, 2019, 28 pages.
"International Search Report and Written Opinion", PCT Application No. PCT/US2018/065557, dated Jun. 21, 2019, 38 pages.
"Non-Final Office Action", U.S. Appl. No. 15/939,060, dated May 23, 2019, 15 pages.
"Notice of Allowance", U.S. Appl. No. 15/842,241, dated Aug. 5, 2019, 6 pages.
"Pre-Interview Communication", U.S. Appl. No. 15/844,093, dated Jun. 28, 2019, 5 pages.
"3rd Generation Partnership Project", Technical Specification Group Radio Access Network; NR and NG-RAN Overall; 3GPP Standard; Technical Specification; 3GPP TS 38.300, 3rd Generation Partnership Project (3GPP), Mobile Competence Centre, Nov. 17, 2017, 56 pages.
"3rd Generation Partnership Project; Technical Specification Group Radio Access Network", Evolved Universal Terrestrial Radio Access (E-UTRA) and NR; Multi-connectivity; Stage 2 (Release 15); 3GPP Standard; Technical Specification; 3GPP TS 37.340, 3rd Generation Partnership Project (3GPP), Mobile Competence Centre, Nov. 17, 2017, 49 pages.
"International Search Report and Written Opinion", PCT Application No. PCT/US2018/041696, dated Oct. 9, 2018, 30 pages.
"International Search Report and Written Opinion", PCT Application No. PCT/US2018/046004, dated Nov. 22, 2018, 13 pages.
"Non-Final Office Action", U.S. Appl. No. 15/852,572, dated Sep. 14, 2018, 6 pages.
"Restriction Requirement", U.S. Appl. No. 15/842,318, dated Oct. 4, 2018, 7 pages.
"Dragonfly Narrowband IoT Unveiled with GNSS Option", GPS World Staff; Retrieved from http://gpsworld.com/dragonfly-narrowband-iot-unveiled-with-gnss-option/ on Dec. 7, 2017, Mar. 7, 2017, 5 pages.
"Leading the LTE IoT Evolution to Connect the Massive Internet of Things", Qualcomm, Inc., Jun. 2017, 41 pages.
"NB-IOT, Accelerating Cellular IOT", Huawei; Roads to MBB 2020; Building a Better Connected World; Global Mobile Broadband Forum 2015; Hong Kong, Nov. 2-5, 2015, 4 pages.
"Restriction Requirement", U.S. Appl. No. 15/852,572, dated Jun. 11, 2018, 9 pages.
Dutta, et al., "Frame Structure Design and Analysis for Millimeter Wave Cellular Systems", avix.org; NYU Wireless, New York University Tandon School of Engineering, Aug. 20, 2016, 31 pages.

Jantti, "Machine Type Communications for Internet of Things—Recent advances and future possibilities", WNCG; Seminar, Oct. 7, 2016, 1 page.
Landstrom, et al., "NB-IOT: A Sustainable Technology for Connecting Billions of Devices", Ericsson Technology Review; Standardizing Narrowband IoT, Apr. 22, 2016, 12 pages.
Pederson, et al., "A Flexible Frame Structure for 5G Wide Area", Aalborg University, Proceedings of IEEE VTC Fall—2015, 2015, 6 pages.
"First Action Interview Office Action", U.S. Appl. No. 15/844,093, dated Sep. 16, 2019, 4 Pages.
"Non-Final Office Action", U.S. Appl. No. 15/832,395, dated Aug. 30, 2019, 20 Pages.
"Non-Final Office Action", U.S. Appl. No. 16/446,416, dated Oct. 18, 2019, 7 Pages.
"Written Opinion of the International Preliminary Examining Authority", PCT Application No. PCT/US2018/049407, dated Oct. 21, 2019, 8 pages.
"Written Opinion of the International Searching Authority", PCT Application No. PCT/US2018/046004, dated Oct. 21, 2019, 6 pages.
"International Search Report and Written Opinion", PCT Application No. PCT/2018/050487, dated Nov. 26, 2018, 13 pages.
"International Search Report and Written Opinion", PCT Application No. PCT/US2018/049407, dated Dec. 14, 2018, 18 pages.
"Evolved Universal Terrestrial Radio Access (E-UTRA)", 3rd Generation Partnership Project; Technical Specification Group Radio Access Network; Evolved Universal Terrestrial Radio Access (E-UTRA); Radio Resource Control (RRC); Protocol specification (Release 10), Mar. 2013, 307 pages.
"First Action Interview Office Action", U.S. Appl. No. 15/842,318, dated May 7, 2019, 3 pages.
"International Search Report and Written Opinion", PCT Application No. PCT/US2018/067367, dated Mar. 20, 2019, 19 pages.
"Invitation to Pay Additional Fees", PCT Application No. PCT/US2018/065557, dated Mar. 13, 2019, 19 pages.
"Invitation to Pay Additional Fees", PCT Application No. PCT/US2018/065829, dated Mar. 15, 2019, 13 pages.
"Non-Final Office Action", U.S. Appl. No. 15/832,395, dated Feb. 27, 2019, 18 pages.
"Non-Final Office Action", U.S. Appl. No. 15/842,241, dated Mar. 11, 2019, 12 pages.
"Notice of Allowance", U.S. Appl. No. 15/852,572, dated Mar. 11, 2019, 5 pages.
"Pre-Interview Communication", U.S. Appl. No. 15/842,318, dated Mar. 29, 2019, 4 pages.
"Final Office Action", U.S. Appl. No. 15/939,060, dated Nov. 29, 2019, 17 pages.
"International Preliminary Report on Patentability", PCT Application No. PCT/US2018/046004, dated Jan. 23, 2020, 21 pages.
"Non-Final Office Action", U.S. Appl. No. 16/126,920, dated Jan. 29, 2020, 21 Pages.
"Notice of Allowance", U.S. Appl. No. 15/842,241, dated Dec. 5, 2019, 5 Pages.
"Written Opinion", PCT Application No. PCT/US2018/065557, dated Nov. 15, 2019, 4 pages.
"Written Opinion of the International Preliminary Examining Authority", PCT Application No. PCT/US2018/065557, dated Feb. 4, 2020, 13 pages.
"International Preliminary Report on Patentability", PCT Application No. PCT/US2018/067367, dated 17, 2020, 23 pages.
"Notice of Allowance", U.S. Appl. No. 16/126,920, dated Apr. 29, 2020, 8 Pages.
"Notice of Allowance", U.S. Appl. No. 15/844,093, dated Mar. 2, 2020, 10 Pages.
"Notice of Allowance", U.S. Appl. No. 15/844,093, dated May 13, 2020, 11 Pages.
"Procedures Associated with Access and Operation of Uplink Common Packet Channel and the Associated Downlink Dedicated Control Channel", TSG-RAN WG 1#4 TSGR1#4(99) 371, Apr. 19-20, 1999, Yokohama, Japan, Apr. 1999, 10 pages.
USPTO, "Final Office Action", U.S. Appl. No. 15/832,395, dated Apr. 2, 2020, 23 Pages.

(56) References Cited

OTHER PUBLICATIONS

"Notice of Allowance", U.S. Appl. No. 15/844,093, dated Sep. 16, 2020, 10 Pages.
"Foreign Office Action", European Application No. 18830637.7, dated Jul. 7, 2020, 7 pages.
"International Preliminary Report on Patentability", PCT Application No. PCT/US2018/041696, dated Jun. 18, 2020, 14 pages.
"International Preliminary Report on Patentability", PCT Application No. PCT/US2018/049407, dated Jun. 25, 2020, 12 pages.
"International Preliminary Report on Patentability", PCT Application No. PCT/US2018/065829, dated Jun. 25, 2020, 20 pages.
"International Preliminary Report on Patentability", PCT Application No. PCT/US2018/065557, dated Jun. 25, 2020, 29 pages.
"International Preliminary Report on Patentability", PCT Application No. PCT/US2018/050487, dated Jun. 25, 2020, 8 pages.

* cited by examiner

500

```
┌─────────────────────────────────────────────┐
│ Determine information about at least one user equipment
│ (UE) device based on at least one pilot signal that is received
│ from the at least one UE device via a wireless transceiver
│ 502
└─────────────────────────────────────────────┘
              ↓
┌─────────────────────────────────────────────┐
│ Customize at least one transmission
│ characteristic based on the information
│ 504
└─────────────────────────────────────────────┘
              ↓
┌─────────────────────────────────────────────┐
│ Cause the wireless transceiver to use the at least
│ one transmission characteristic to transmit a system
│ information message to the at least one UE device
│ 506
└─────────────────────────────────────────────┘
```

FIG. 5

CUSTOMIZING TRANSMISSION OF A SYSTEM INFORMATION MESSAGE

CROSS-REFERENCE TO RELATED APPLICATION

This application claims the benefit of U.S. Provisional Application No. 62/599,500 filed 15 Dec. 2017, the disclosure of which is hereby incorporated by reference in its entirety herein.

BACKGROUND

The evolution of wireless communication to fifth-generation (5G) standards and technologies provide higher data rates and greater capacity, with improved reliability and lower latency, which enhances mobile broadband services. 5G technologies also provide new classes of services for vehicular, fixed wireless broadband, and the Internet of Things (IoT). The specification of the features in the 5G air interface is defined as 5G New Radio (5G NR).

A user equipment (UE) device uses system information from a base station to establish communication with the base station. The system information can include, for example, channel information or bandwidth configurations. In general, the same system information is provided to multiple UE devices that attempt to communicate with the base station.

In some approaches, the base station transmits the system information in multiple directions using a fixed or default frequency without prior knowledge of a location of the UE device. If the UE device is able to receive the system information at the location, the UE device may establish a connection to the base station. As wireless communication techniques utilize higher frequencies, however, a higher path loss is experienced, which reduces signal strength. Thus, an effective range at which the UE device can receive the system information may be significantly reduced. Consequently, some UE devices may be unable to receive the system information and establish communication with the base station. With decreased coverage, users may become frustrated with the lack of service or service providers may experience increased costs associated with installing additional base stations.

SUMMARY

Techniques and apparatuses are described that enable customizing transmission of a system information message. One or more transmission characteristics of the system information message can be tailored for a particular user equipment (UE) device or a group of UE devices. In one aspect, a response frequency used to transmit the system information message is customized based on a requested frequency of the UE device. In another aspect, a beamform pattern used to transmit the system information message is customized based on an angle to the UE device. In general, these customizations increase an amplitude of the system information message at the UE device, which increases an effective range of the system information message and enables a larger quantity of UE devices to establish communication with a base station. The customization also enables the base station to efficiently transmit the system information message to one or more UE devices, thereby conserving power or time.

Aspects described below include an apparatus having an antenna array, a wireless transceiver, and a system information response module. The wireless transceiver is configured to receive, via the antenna array, at least one pilot signal from at least one user equipment (UE) device. The wireless transceiver is also configured to transmit, via the antenna array, a system information message to the at least one UE device. The system information response module is configured to determine information about the at least one UE device based on the at least one pilot signal. Based on the information, the system information response module is configured to customize at least one transmission characteristic. The system information response module is also configured to cause the wireless transceiver to use the at least one transmission characteristic to transmit the system information message to the at least one UE device.

Aspects described below also include a method for customizing transmission of a system information method. The method includes determining information about at least one user equipment (UE) device based on at least one pilot signal that is received from the at least one UE device via a wireless transceiver. The method also includes customizing at least one transmission characteristic based on the information. The method additionally includes causing the wireless transceiver to use the at least one transmission characteristic to transmit a system information message to the at least one UE device.

Aspects described below also include one or more computer-readable storage media storing executable instructions, that, responsive to execution by a processor, implement a system information response module. The system information response module is configured to analyze at least one pilot signal that is received from at least one user equipment (UE) device to determine information about the at least one UE device. Based on the information, the system information response module is configured to customize at least one transmission characteristic. The system information response module is also configured to cause a wireless transceiver to use the at least one transmission characteristic to transmit a system information message to the at least one UE device.

Aspects described below also include a system comprising means for customizing at least one transmission characteristic of a system information message based on information provided via at least one pilot signal that is received from at least one user equipment (UE) device.

BRIEF DESCRIPTION OF THE DRAWINGS

Apparatuses for and techniques enabling customizing transmission of a system information message are described with reference to the following drawings. The same numbers are used throughout the drawings to reference like features and components:

FIG. 5 illustrates an example method for customizing transmission of a system information message.

DETAILED DESCRIPTION

Overview

This document describes techniques and devices for customizing transmission of a system information message. Some approaches may transmit a system information message using a generic (e.g., default or pre-programmed) frequency. Other approaches may use a generic beamform pattern or scanning process to transmit the system information message in multiple directions. For example, an omni-directional beamforming pattern may be used or a narrow beam may be scanned across multiple angles.

In contrast, the techniques and devices described herein are designed to improve communication performance by tailoring transmission of the system information message for a particular user equipment (UE) device or a group of UE devices. These customizations increase an amplitude of the system information message by considering preferences of the UE device or a location of the UE device. In this way, the system information message may be received at farther ranges, which enables a larger quantity of UE devices to establish connections to a base station. This document now turns to an example environment, after which an example apparatus, an example method, and an example computing system are described.

Example Environment

Figure 1:
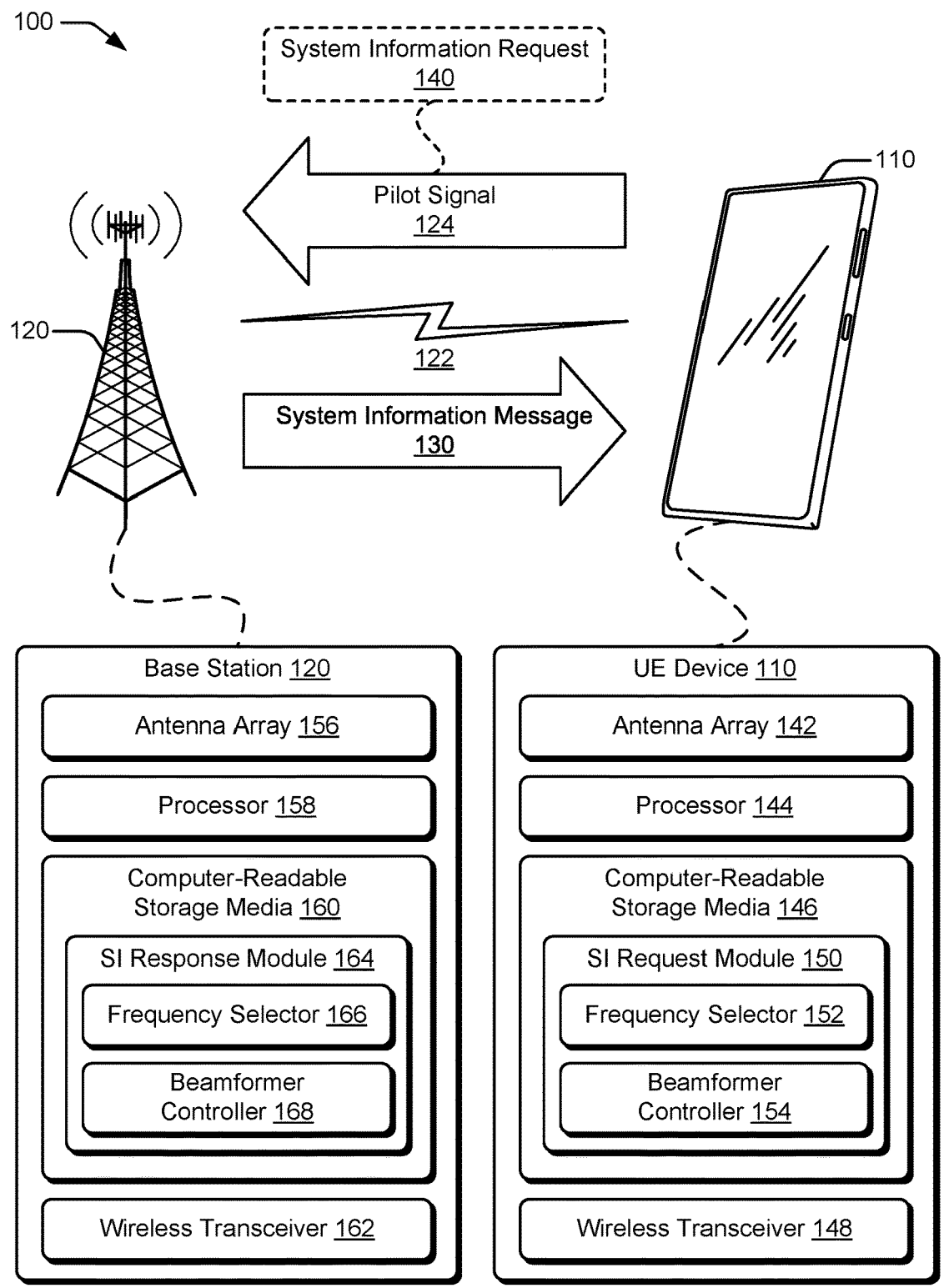
FIG. 1 illustrates an example environment in which customizing transmission of a system information message can be implemented.

FIG. 1 illustrates an example environment 100 for customizing transmission of a system information message. In the depicted environment 100, a UE device 110 and a base station 120 communicate over a wireless communication link 122 (wireless link 122). The wireless link 122 can include a downlink of data or control information communicated from the base station 120 to the UE device 110 or an uplink of other data or control information communicated from the UE device 110 to the base station 120. In this example, the UE device 110 is implemented as a smart phone. However, the UE device 110 may be implemented as any suitable computing or electronic device, such as a mobile communication device, a modem, a cellular phone, a mobile-internet device (MID), a gaming device, a navigation device, a media device, a laptop, a tablet, a smart appliance, an Advanced Driver Assistance System (ADAS), a point-of-sale (POS) transaction system, a health monitoring device, a drone, a camera, a wearable smart-device, a personal media device, and the like.

As explained in further detail below, the wireless link 122 may be used by the UE device 110 to transmit a pilot signal 124 to the base station 120 and used by the base station 120 to transmit a system information (SI) message 130 (e.g., a system information block (SIB)) to the UE device 110. In some cases, the pilot signal 124 comprises a system information request 140 for directly requesting transmission of the system information message 130. The wireless link 122 may be implemented using any suitable communication protocol or standard, such as a Long-Term Evolution (LTE) protocol, a fourth-generation (4G) protocol, a 5G protocol, Institute of Electrical and Electronics Engineers (IEEE) 802.11, IEEE 802.16, Bluetooth™, and so forth.

The UE device 110 includes at least one antenna array 142, at least one processor 144, at least one computer-readable storage media 146, and at least one wireless transceiver 148. The wireless transceiver 148 includes circuitry and logic for transmitting and receiving communication signals via the antenna array 142. Components of the wireless transceiver 148 can include amplifiers, switches, mixers, analog-to-digital converters, filters, and so forth for conditioning the communication signals. The wireless transceiver 148 may also include logic to perform in-phase/quadrature (I/Q) operations, such as synthesis, encoding, modulation, decoding, demodulation, and so forth. In some cases, components of the wireless transceiver 148 are implemented as separate receiver and transmitter entities. Additionally or alternatively, the wireless transceiver 148 can be realized using multiple or different sections to implement respective receiving and transmitting operations (e.g., separate transmit and receiver chains). In general, the wireless transceiver 148 processes data and/or signals associated with communicating data over the antenna array 142 via the wireless link 122, such as the pilot signal 124 or the system information request 140.

The processor 144 may include any type of processor, such as a single core processor or a multiple core processor, that executes processor-executable code stored by the CRM 146. The processor 144, which can be implemented as a modem or an application processor, controls the wireless transceiver 148 and enables wireless communication to be performed. In general, the processor 144 can be implemented within or separate from the wireless transceiver 148 and can include a portion of the CRM 146 or have access to the CRM 146 to obtain computer-readable instructions. The CRM 146 may include any suitable type and/or combination of storage media, volatile memory (e.g., random access memory (RAM)), non-volatile memory (e.g., Flash memory), optical media, magnetic media (e.g., disk), and so forth. In the context of this disclosure, the CRM 146 is implemented to store instructions, data, and other information of the UE device 110, and thus does not include transitory propagating signals or carrier waves. The CRM 146 may store firmware, an operating system, data, or applications of the UE device 110 as instructions that are executed by the processor 144 to implement various functionalities of the UE device 110. In this example, the CRM 146 includes a system information (SI) request module 150, which comprises a frequency selector 152 and a beamformer controller 154.

The system information request module 150 causes the wireless transceiver 148 and the antenna array 142 to transmit the pilot signal 124 with information regarding a requested frequency selected by the frequency selector 152 or with a beamform pattern selected by the beamformer controller 154. The frequency selector 152 determines the requested frequency based on channel performance or a known selectivity of the UE device 110 (e.g., a frequency for which the UE device 110 is tuned for or achieves a target sensitivity). In general, the requested frequency is determined by the frequency selector 152 to achieve a target gain or signal-to-noise ratio, which may be larger compared to performance at other frequencies. In some cases, the pilot signal 124 may contain information regarding the requested frequency or may be transmitted using the requested frequency. The beamformer controller 154 determines a beamform pattern to concentrate energy at an angle associated with a location of the base station 120.

In some cases, the pilot signal 124 comprises the system information request 140, which notifies the base station 120 that the system information message 130 is requested by the UE device 110. The system information message 130 can include an identification number associated with the UE device 110 to enable the base station 120 to maintain a record of which of the UE devices 110 initiated a system information request 140. In some cases, the pilot signal 124 is transmitted autonomously to the base station 120 prior to or without receiving a grant from the base station 120.

The base station 120 receives the pilot signal 124 from the UE device 110. Although depicted as a tower of a cellular network, the base station 120 may represent or be implemented as another device or wireless-communication node, such as an enhanced NodeB (eNB), a gNodeB (gNB), a next-generation enhanced NodeB (ng-eNB), a Wi-Fi™ router, a satellite, a terrestrial television broadcast tower, an access point, a peer-to-peer device, a mesh network node, another smart phone acting as a base station, and so forth.

Responsive to receiving the pilot signal 124, the base station 120 transmits the system information message 130 to provide the UE device 110 configuration details for establishing a connection. Generally, the system information message 130 includes channel information, bandwidth configurations, numerology, and so forth, to enable the UE device 110 to configure itself and establish communication with the base station 120. The system information message 130 is a common message that is transmitted to any UE device 110 attempting to access the network via the base station 120. In other words, the content of the system information message 130 typically remains unchanged (e.g., the same) for different UE devices 110.

The base station 120 includes at least one antenna array 156, at least one processor 158, at least one computer-readable storage media (CRM) 160, and at least one wireless transceiver 162. The wireless transceiver 162 includes at least one receiver and at least one transmitter for communicating with the UE device 110 via the antenna array 156. The processor 158 executes processor-executable instructions of the computer-readable storage media (CRM) 160. In some cases, the processor 158 is implemented as a multicore processor. Similar to the CRM 146, the CRM 160 may include any suitable type and/or combination of storage media, such as read-only memory (ROM), random access memory (RAM), or Flash memory. The CRM 160 is implemented as storage media, and thus does not include transitory signals or carrier waves. The CRM 160 may store firmware, an operating system, data, or applications of the base station 120 as instructions that are executed by the processor 158 to implement various functionalities of the base station 120.

In this example, the CRM 160 includes a system information (SI) response module 164. The system information response module 164 customizes transmission of the system information message 130 for the UE device 110 based on information derived from the pilot signal 124. In other words, the system information response module 164 causes the wireless transceiver 162 to use one or more customized transmission characteristics to transmit the system information message 130 to the UE device 110. The system information response module 164 can include a frequency selector 166 or a beamformer controller 168.

The frequency selector 166 analyzes the pilot signal 124 to determine the requested frequency of the UE device 110. If the requested frequency is used to transmit the pilot signal 124, for example, the frequency selector 166 may identify a radio frequency of the pilot signal 124 to determine the requested frequency. As another example, the frequency selector 166 may decode or process the pilot signal 124 if the pilot signal 124 contains information regarding the requested frequency. In this manner, the frequency selector 166 extracts information regarding the requested frequency from the pilot signal 124. Based on the requested frequency, the frequency selector 166 customizes a response frequency that is used to transmit the system information message 130 to the UE device 110. The frequency selector 166 may cause the response frequency to be approximately equal to the requested frequency or cause the response frequency to be one of the available frequencies within a list that is closest to the requested frequency.

The beamformer controller 168 analyzes the pilot signal 124 to indirectly determine an angle to the UE device 110. For example, the beamformer controller 168 can determine an angle of arrival of the pilot signal 124 based on an angle at which the received energy from the pilot signal 124 is strongest. In general, the angle of arrival represents a high-gain path to the UE device 110, which may correspond to a direct line-of-sight angle to the UE device 110 or an angle associated with multipath propagation. Based on the angle, the beamformer controller 168 customizes a beamform pattern that is used to transmit the system information message 130 to the UE device 110. The beamform pattern may be customized to have a peak with a beamwidth that encompasses the angle to the UE device 110. The beamformer controller 168 can select the beamform pattern from an available set of beamform patterns or dynamically generate the beamform pattern. In this way, the beamformer controller 168 steers the system information message 130 based on the angle to the UE device 110.

Using the response frequency or the beamform pattern, the system information response module 164 increases a likelihood that the UE device 110 receives the system information message 130. As explained in further detail with respect to FIGS. 2-4, the customized transmission of the system information message 130 may be based on an individual UE device 110 or based on a group of UE devices 110.

Figure 2:
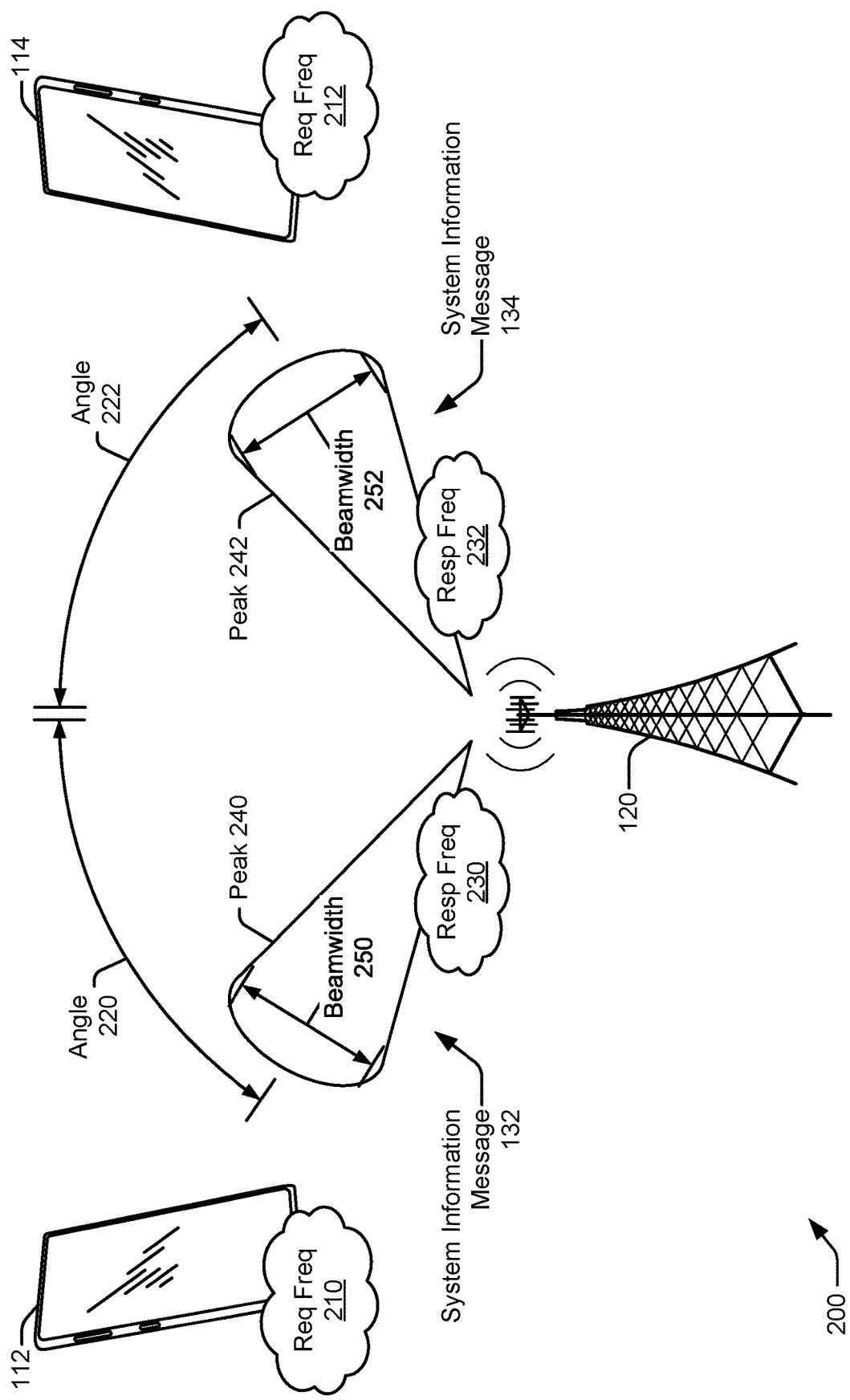
FIG. 2 illustrates an example environment for individual customized transmission of the system information message.

FIG. 2 illustrates an example environment 200 for individual customized transmission of the system information message 130. In the depicted environment 200, both a first UE device 112 and a second UE device 114 transmit pilot signals 124 to the base station 120 (as shown in FIG. 1). As described above, the frequency selector 166 determines that the first UE device 112 has a first requested frequency 210 (Req Freq 210) and that the second UE device 114 has a second requested frequency 212 (Req Freq 212). The beamformer controller 168 may also determine that locations of the first UE device 112 and the second UE device 114 are associated with a first angle 220 and a second angle 222, respectively.

For the first UE device 112, the base station 120 transmits a first system information message 132 using a first response frequency 230 (Resp Freq 230) determined by the frequency selector 166 or a first beamform pattern determined by the beamformer controller 168. As shown in FIG. 2, the first beamform pattern has a first peak 240 with a first beamwidth 250 that encompass the first angle 220. For the second UE device 114, the base station 120 transmits a second system information message 134 using a second response frequency 232 or a second beamform pattern having a second peak 242 with a second beamwidth 252. The second peak 242 is directed towards the angle 222. The peak may correspond to a main lobe, a grating lobe, or a high sidelobe of the beamform pattern formed by the antenna array 156. As shown in the depicted environment 200, the first beamwidth 250 and the second beamwidth 252 can be narrow to concentrate energy at respective angles 220 and 222 to the first UE device 112 and the second UE device 114, respectively.

In some situations, the first UE device 112 and the second UE device 114 can have a similar requested frequency. The base station 120 may therefore transmit a single system information message 130, which is received by both the first UE device 112 and the second UE device 114. To transmit the system information message 130 to both of the UE devices 112 and 114, the system information response module 164 causes the wireless transceiver 162 to use a single response frequency and a beamform pattern that has peaks at the angles 220 and 222. If the first UE device 112 and the second UE device 114 are at similar angles, the beamformer controller 168 may customize the beamform pattern to have a single peak that encompasses both of the angles 220 and 222, as shown in FIG. 3.

Figure 3:
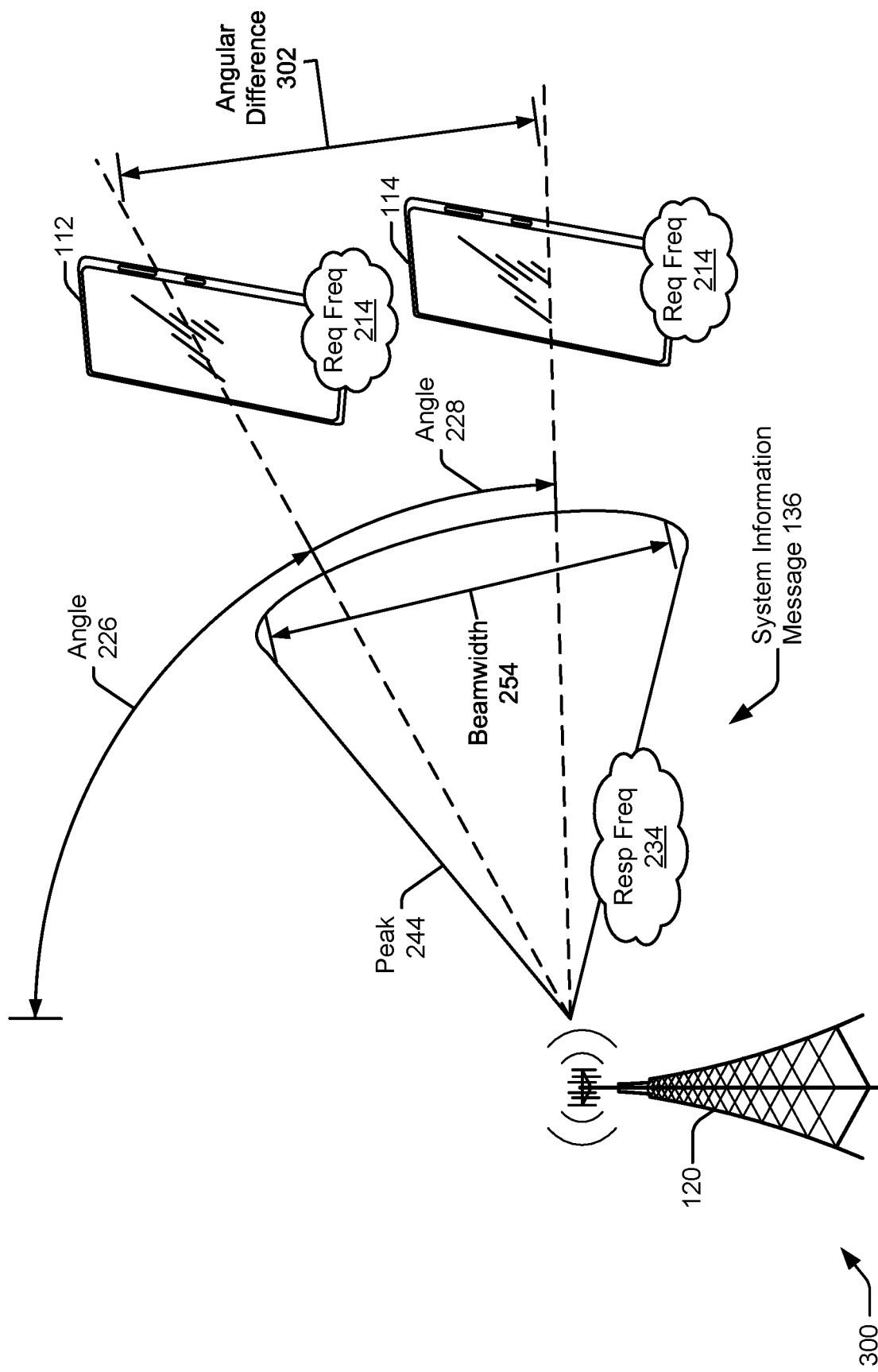
FIG. 3 illustrates an example environment for group-customized transmission of the system information message.

FIG. 3 illustrates an example environment 300 for group-customized transmission of the system information message 130. In the depicted environment 300, both the first UE device 112 and the second UE device 114 transmit pilot signals 124 to the base station 120 (as shown in FIG. 1). In this case, the frequency selector 166 determines that both the first UE device 112 and the second UE device 114 have a requested frequency 214. Based on the requested frequency 214, the frequency selector 166 selects a response frequency 234.

The beamformer controller 168 determines that locations of the first UE device 112 and the second UE device 114 are respectively associated with an angle 224 and 226, which have an angular difference 302. Because the angles 224 and 226 are within an angular window (e.g., the angular difference 302 is below an angular threshold), the beamformer controller 168 selects a beamform pattern having a peak 244 with a beamwidth 254 that encompasses the angles 224 and 226. In some cases, the angular window may represent a maximum beamwidth that can be formed via the antenna array 156 and the wireless transceiver 162. In comparing the beamwidth 254 of FIG. 3 with the beamwidths 250 or 252 of FIG. 2, the beamwidth 254 is wider such that energy is directed towards both the first UE device 112 and the second UE device 114 using a single peak 244. Although the peak 244 may cause the system information message 136 to have a lower amplitude relative to the peaks 240 or 242 of FIG. 2, the base station 120 may use a higher transmission power level to transmit the system information message 136, which may compensate for the wider beamwidth 254. This higher transmission power level can be achieved for transmission of a single system information message 130 because available power is not divided for transmitting multiple system information messages 130 simultaneously.

In some cases, the beamformer controller 168 can position an angle of the peak 244 between the angles 224 and 226 or at an average angle of the angles 224 and 226. Although the peak 244 in FIG. 3 is shown to be directed at an angle that is evenly between the first UE device 112 and the second UE device 114, the peak 244 can alternatively be directed closer towards one of the UE devices 112 or 114. Consider, for example, that an amplitude of a first pilot signal 124, which is transmitted by the first UE device 112, is determined by the beamformer controller 168 to be weaker than an amplitude of a second pilot signal 124, which is transmitted by the second UE device 114. This may occur if the first UE device 112 is positioned at a farther range than the second UE device 114, if the angle 224 to the first UE device 112 is not a direct line-of-sight angle (e.g., an angle associated with multipath propagation), if the UE device 112 is operating at a different operational mode (e.g., a low-power mode), if the UE device 112 has poorer performance than the UE device 114, or if there is an attenuator between the base station 120 and the first UE device 110. Based on this detected difference, the beamformer controller 168 can direct the peak 244 closer towards the first UE device 112 to increase the amplitude of the system information message 136 at the first UE device 112. As a result, a likelihood of the first UE device 112 receiving the system information message 130 improves. In many cases, the performance improvement for the first UE device 112 can be realized without substantially impacting performance of the other UE device 114. Other transmission characteristics of the system information message 136 can be adjusted to enable the second UE device 114 to receive the system information message 136, such as adjusting the response frequency 234 if the second UE device 114 has a different requested frequency, adjusting the beamwidth 254, or increasing transmission power.

Although not explicitly shown, the beamformer controller 168 may also use beamforming techniques to simultaneously form multiple peaks at distinct angles. Thus, the base station 120 can use multiple peaks to transmit the system information message 130 to multiple UE devices 110 that are located at different angles instead of widening the beamwidth 254.

In the depicted environment 300, the requested frequencies 214 of the first UE device 112 and the second UE device 114 are approximately equal to one another. Alternatively, if the requested frequencies are different and within a frequency window (e.g., a difference between the requested frequencies is less than a frequency threshold), the frequency selector 166 may set the response frequency 234 to a value that is between these requested frequencies (e.g., at an average requested frequency). Similar to the angle of the peak 244, the response frequency can be biased towards one of the UE device 112 or 114 to improve performance for a particular UE device 112 or 114.

The techniques described above enable the frequency selector 166 and the beamformer controller 168 to dynamically adjust transmission characteristics of the system information message 130. While the characteristics may be biased towards one or more UE devices 110 within a group of UE devices 110, the groups are identified such that each UE device 110 within the group may receive the system information message 130. Generally speaking, the system information response module 164 can customize transmission of the system information message 130 to service any group of UE devices 110. For determining whether to transmit an individually customized transmission or a group-customized transmission, the system information response module 164 can determine a quantity of UE devices 110 that desire the system information message 130 and identify which of the UE devices 110 to service with a single system information message 130, as described in further detail with respect to FIG. 4.

Figure 4:
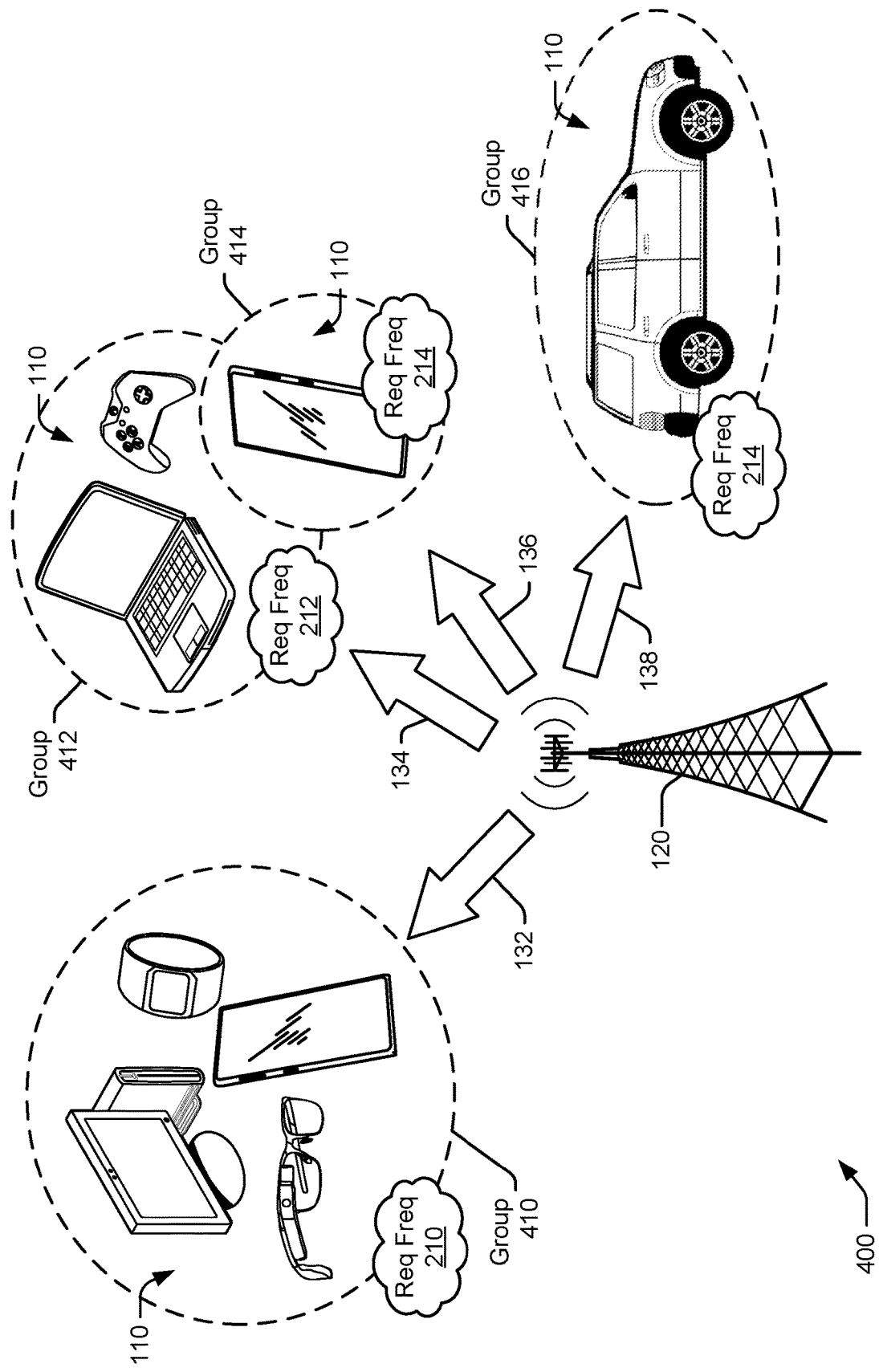
FIG. 4 illustrates an example environment for determining individual or group customized transmission of a system information message.

FIG. 4 illustrates an example environment 400 for determining individual or group-customized transmission of the system information message 130. In the depicted environment 400, the base station 120 receives multiple pilot signals 124 from respective UE devices 110. Via the pilot signals 124, the system information response module 164 identifies multiple UE devices 110 that seek communication with the base station 120. Based on the requested frequency or the measured angles to the individual UE devices 110, the system information response module 164 groups the UE devices 110 and customizes transmission of the system information message 130 for each group. The system information response module 164 can group the UE devices 110 in such a way as to minimize relative differences between the angles or requested frequencies of the UE devices 110 within a group. In some cases, the system information response module 164 can consider other performance parameters (e.g., signal strength of the pilot signal 124) or preferences of the UE devices 110 to optimize an effective range of the system information message 130 for each group.

For example, a first system information message 132 is transmitted for a first group 410 of UE devices 110 that are co-located and have a first requested frequency 210. In some cases, the beamform pattern used for the first system information message 132 may be directed towards an average angle of the UE devices 110 within the first group 410 or the response frequency may be an average of the requested frequencies of the UE devices 110 within the first group 410. A second system information message 134 is transmitted for a second group 412 of UE devices 110 that are co-located and have a second requested frequency 212. Although a third group 414 of UE devices 110, which in this case includes a single UE device 110, is at a similar angle as the second group 412, a third system information message 136 is transmitted for the third group 414 based on a third requested frequency 214 being significantly different than the second requested frequency 212 of the second group 412. Similarly, a fourth group 416 of UE devices 110 desire the third requested frequency 214 but are located at a different angle than the third group 414. Accordingly, a fourth system information message 138 is transmitted for the fourth group 416.

Example Methods

FIG. 5 depicts an example method 500 for customizing transmission of a system information message. Method 500 is shown as sets of operations (or acts) performed but not necessarily limited to the order or combinations in which the operations are shown herein. Further, any of one or more of the operations may be repeated, combined, reorganized, or linked to provide a wide array of additional and/or alternate methods. In portions of the following discussion, reference may be made to environments 100, 200, 300, and 400 of FIGS. 1-4 and entities detailed in FIG. 1, reference to which is made for example only. The techniques are not limited to performance by one entity or multiple entities operating on one device.

At 502, information about at least one user equipment (UE) device is determined based on at least one pilot signal that is received from the at least one UE device via a wireless transceiver. For example, the system information response module 164 can determine information about the UE device 110 by analyzing the pilot signal 124 that is received from the UE device 110 via the wireless transceiver 162. The system information response module 164 may include a frequency selector 166 or a beamformer controller 168, which respectively determine information regarding the requested frequency of the UE device 110 and the angle to the UE device 110. In some cases, the system information response module 164 determines a signal strength of the pilot signal 124, which may be dependent upon a distance to the UE device 110 or other environmental factors.

At 504, at least one transmission characteristic is customized based on the information. For example, the frequency selector 166 or the beamformer controller 168 may respectively customize the response frequency or the beamform pattern based on the information. The customization may be applied with respect to a single UE device 110, as shown in FIG. 2, or multiple UE devices 110, as shown in FIGS. 3 and 4. In some cases, the customization is designed to increase an amplitude of the system information message 130 at a particular UE device 110 within a group of UE devices 110, such as a UE device 110 that transmitted a weaker pilot signal 124 relative to another pilot signal 124 transmitted via another UE device 110 within the group.

At 506, the wireless transceiver is caused to use the at least one transmission characteristic to transmit a system information message to the at least one UE device. For example, the system information response module 164 causes the wireless transceiver 162 to use the customized response frequency or the customized beamform pattern to transmit the system information message 130 to one or more UE devices 110. In this way, an amplitude of the system information message 130 is increased at the one or more UE devices 110 relative to other approaches. With the increase in amplitude, the UE device 110 may receive the system information message 130 at farther distances and a larger quantity of UE devices 110 may access the network via the base station 120.

Example Computing System

Figure 6:
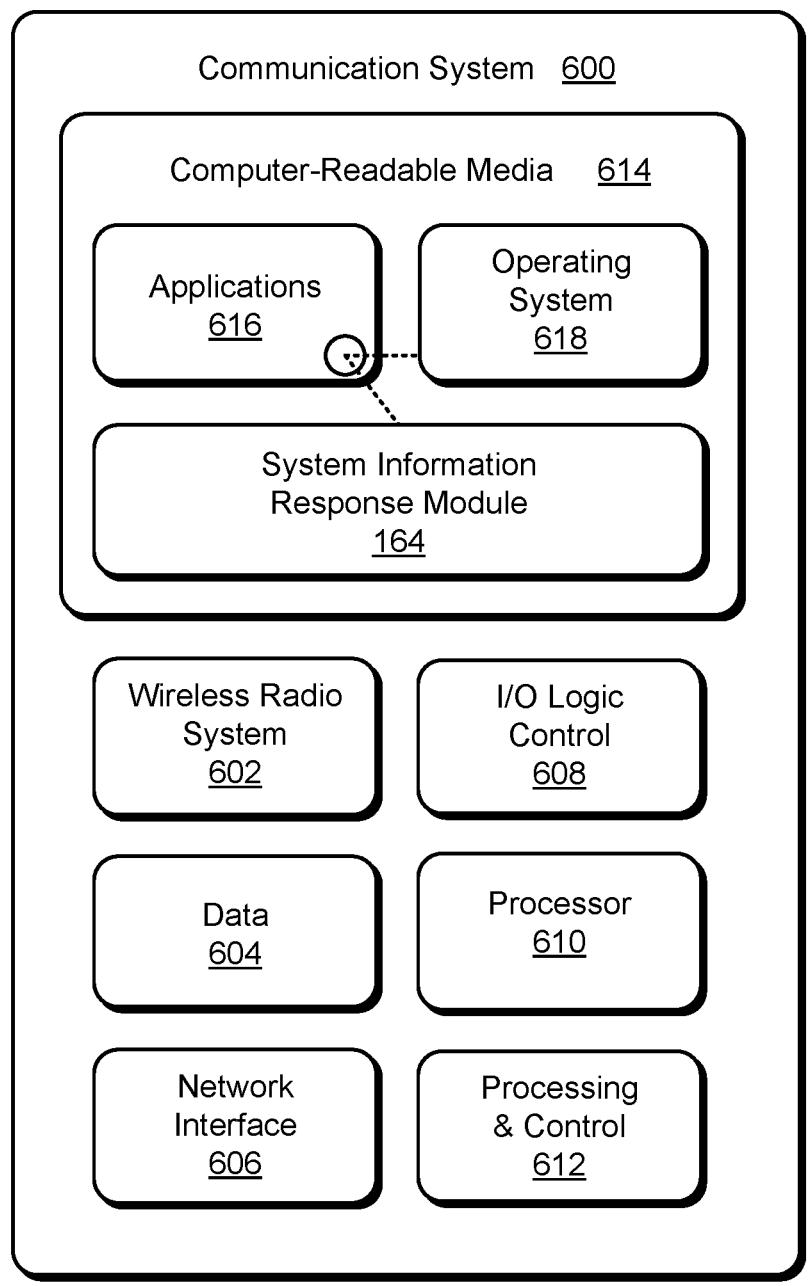
FIG. 6 illustrates an example communication system embodying, or in which may be implemented, techniques for customizing transmission of a system information message.

FIG. 6 illustrates an example communication system 600 that can be implemented as any type of communication device, such as the base station 120 of FIG. 1, to implement customizing transmission of a system information message. The communication system 600 includes at least one wireless radio system 602 to communicate with a network. The wireless radio system 602 enables wireless communication of data 604 to other devices, such as the UE device 110. To establish communication between the communication system 600 and the other device, for example, the data 604 can comprise a system information message 130. The wireless radio system 602 includes an antenna (e.g., the antenna array 156 of FIG. 1) and a wireless transceiver (e.g., the wireless transceiver 162 of FIG. 1), which may be configured to support a particular wireless communication technology. The communication system 600 can also include at least one network interface 606, such as a wireless interface for communicating with other devices via Wireless Local Area Networks (WLANs), wireless Personal Area Networks (PANs), and for network communication, such as via the Internet. The network interface 620 may include Wi-Fi™, Bluetooth™, IEEE 802.11, IEEE 802.16, and so forth.

The communication system 600 also includes an input-output (I/O) logic control 608 (e.g., to include electronic circuitry) and one or more processors 610 (e.g., a microprocessor or a controller). The processor 610 executes various computer-executable instructions to control the operation of the communication system 600 and to enable techniques for, or in which can be embodied, customizing transmission of a system information message. Alternatively or in addition, the communication system 600 can be implemented with any one or combination of hardware, firmware, or fixed logic circuitry that is implemented in connection with processing and control circuits, which are generally identified at 612. Although not shown, the communication system 600 can include a system bus or data transfer system that couples the various components within the communication system 600. A system bus can include any one or combination of different bus structures, such as a memory bus or memory controller, a peripheral bus, a universal serial bus, and/or a processor or local bus that utilizes any of a variety of bus architectures.

The communication system 600 includes various firmware and/or software, which may be maintained as computer executable instructions by a computer-readable media (CRM) 614. The CRM 614 may be implemented as one or more memory devices that enable persistent and/or non-transitory data storage (i.e., in contrast to mere signal transmission). The CRM 614 provides data storage mechanisms to store the data 604, as well as various applications 616 and any other types of information and/or data related to operational aspects of the communication system 600. For example, an operating system 618 can be maintained as an application 616 within the computer-readable media 614 and executed by the processor 610. The applications 616 may also include a system manager, such as any form of a control application, software application, signal-processing and control module, code that is native to a particular component, a hardware abstraction layer for a particular component, and so on. The applications 616 also include any system components, engines, or managers to implement customizing transmission of the system information message 130. In this example, the applications 616 include the system information response module 164.

CONCLUSION

Although techniques using, and apparatuses including, customizing transmission of a system information message have been described in language specific to features and/or methods, it is to be understood that the subject of the appended claims is not necessarily limited to the specific features or methods described. Rather, the specific features and methods are disclosed as example implementations of customizing transmission of a system information message.

What is claimed is:

1. A base station apparatus comprising:
an antenna array;
a wireless transceiver configured to:
  receive, using the antenna array, a first pilot signal from a first user equipment (UE) device;
  receive, using the antenna array, a second pilot signal from a second UE device; and
  transmit, using the antenna array, a system information message to both the first UE device and the second UE device; and
a system information response module configured to:
  determine first information about the first UE device based on the first pilot signal, the first information including a first requested frequency;
  determine second information about the second UE device based on the second pilot signal, the second information including a second requested frequency;
  customize at least one transmission characteristic based on both the first information and the second information, the at least one transmission characteristic including a response frequency; and
  cause the wireless transceiver to use the at least one transmission characteristic to transmit the system information message to both the first UE device and the second UE device.

2. The base station apparatus of claim 1, wherein the system information response module includes a beamformer controller configured to:
analyze the first pilot signal to determine a first angle to the first UE device, the first information including the first angle;
analyze the second pilot signal to determine a second angle to the second UE device, the second information including the second angle;
customize a beamform pattern based on both the first angle and the second angle, the at least one transmission characteristic including the beamform pattern; and
cause the wireless transceiver to use the beamform pattern to transmit the system information message to both the first UE device and the second UE device.

3. The base station apparatus of claim 2, wherein:
the beamformer controller is configured to:
  customize the beamform pattern to have a first peak at the first angle and a second peak at the second angle;
  customize the beamform pattern to have a peak with a beamwidth that encompasses both of the first angle and the second angle; or
  customize the beamform pattern to have a peak at another angle that is between the first angle and the second angle.

4. The base station apparatus of claim 1, wherein:
the system information response module includes a frequency selector configured to:
  specify the response frequency to be approximately equal to the first requested frequency;
  specify the response frequency to be approximately equal to the second requested frequency; or
  specify the response frequency to be between the first requested frequency and the second requested frequency.

5. The base station apparatus of claim 1, wherein:
the wireless transceiver is further configured to:
  receive, using the antenna array, the first pilot signal at a first radio frequency that is equal to the first requested frequency; and
  receive, using the antenna array, the second pilot signal at a second radio frequency that is equal to the second requested frequency; and
the system information response module includes a frequency selector configured to analyze the first radio frequency and the second the second radio frequency to determine the first requested frequency and the second requested frequency, respectively.

6. The base station apparatus of claim 1, wherein:
the first pilot signal includes information regarding the first requested frequency;
the second pilot signal includes other information regarding the second requested frequency; and
the system information response module includes a frequency selector configured to decode both the information within the first pilot signal and the other information within the second pilot signal to determine the first requested frequency and the second requested frequency, respectively.

7. A base station method comprising:
determining first information about a first user equipment (UE) device based on a first pilot signal that is received from the first UE device using a wireless transceiver, the first information including a first requested frequency;
determining second information about a second UE device based on a second pilot signal that is received from the second UE device using the wireless transceiver, the second information including a second requested frequency;
customizing at least one transmission characteristic based on both the first information and the second information, the at least one transmission characteristic including a response frequency; and
causing the wireless transceiver to use the at least one transmission characteristic to transmit a system information message to both the first UE device and the second UE device.

8. The base station method of claim 7, wherein the at least one transmission characteristic increases an amplitude of the system information message at both the first UE device and the second UE device compared to another transmission characteristic.

9. The base station method of claim 7, wherein:
the first pilot signal comprises a first system information request message;

the second pilot signal comprises a second system information request message; and the first system information request message, the second system information request message, and the system information message are based on a fifth-generation (5G) wireless protocol.

10. The base station method of claim 7, wherein the wireless transceiver is configured to receive both the first pilot signal and the second pilot signal without having prior knowledge of the first UE device and the second UE device.

11. The base station method of claim 7, further comprising:

determining third information about a third UE device based on a third pilot signal that is received from the third UE device using the wireless transceiver the third information including a third requested frequency;

identifying a group of UE devices that have respective requested frequencies within a frequency window, the group of UE devices including the first UE device, the second UE device, and the third UE device, the respective requested frequencies including the first requested frequency, the second requested frequency, and the third requested frequency;

customizing the response frequency based on the respective requested frequencies of the group of UE devices; and causing the wireless transceiver to use the response frequency to transmit the system information message to the group of UE devices.

12. The base station method of claim 11, further comprising:

analyzing the first pilot signal, the second pilot signal, and the third pilot signal to determine respective angles of the first UE device, the second UE device, and the third UE device;

identifying at least a portion of the group of UE devices that have the respective angles within an angular window, the portion of the group of UE devices including at least the first UE device and the second UE device;

customizing a beamform pattern having a peak with a beamwidth that encompass the respective angles of the portion of the group of UE devices; and causing the wireless transceiver to use both the response frequency and the beamform pattern to transmit the system information message to the portion of the group of UE devices.

13. The base station method of claim 12, wherein:

the determining of the first information comprises:

determining that the first pilot signal has a smaller amplitude relative to the second pilot signal; and the customizing of the beamform pattern comprises generating the beamform pattern such that the peak is at an angle that is between the first angle and an average between the first angle and the second angle.

14. The base station method of claim 7, further comprising:

analyzing the first pilot signal to determine a first angle to the first UE device, the first information including the first angle;

analyze the second pilot signal to determine a second angle to the second UE device, the second information including the second angle; and customize a beamform pattern based on both the first angle and the second angle, the at least one transmission characteristic including the beamform pattern.

15. The base station method of claim 14, wherein:

the customizing of the beamform pattern comprises:

generating the beamform pattern to have a first peak at the first angle and a second peak at the second angle;

generating the beamform pattern to have a peak with a beamwidth that encompasses both of the first angle and the second angle; or generating the beamform pattern to have the peak at another angle that is between the first angle and the second angle.

16. The base station method of claim 7, further comprising:

specifying the response frequency to be approximately equal to the first requested frequency;

specifying the response frequency to be approximately equal to the second requested frequency; or specifying the response frequency to be between the first requested frequency and the second requested frequency.

17. The base station method of claim 7, wherein:

the determining of the first information and the determining of the second information comprises:

receiving the first pilot signal at a first radio frequency that is equal to the first requested frequency;

receiving the second pilot signal at a second radio frequency that is equal to the second requested frequency; and analyzing the first radio frequency and the second the second radio frequency to determine the first requested frequency and the second requested frequency, respectively.

18. The base station method of claim 7, wherein:

the first pilot signal includes information regarding the first requested frequency;

the second pilot signal includes other information regarding the second requested frequency; and the determining of the first information and the determining of the second information comprises:

decoding both the information within the first pilot signal and the other information within the second pilot signal to determine the first requested frequency and the second requested frequency, respectively.

19. One or more computer-readable storage media storing executable instructions, that, responsive to execution by a processor, implement in a base station a system information response module configured to:

analyze a first pilot signal that is received from a first user equipment (UE) device to determine first information about the first UE device, the first information including a first requested frequency;

analyze a second pilot signal that is received from a second UE device to determine second information about the second UE device, the second information including a second requested frequency;

customize at least one transmission characteristic based on both the first information and the second information, the at least one transmission characteristics including a response frequency; and cause a wireless transceiver to use the at least one transmission characteristic to transmit a system information message to both the first UE device and the second UE device.

20. The computer-readable storage media of claim 19, the system information response module further configured to:

analyze the first pilot signal to determine a first angle to the first UE device, the first information including the first angle;

analyze the second pilot signal to determine a second angle to the second UE device, the second information including the second angle;

customize a beamform pattern based on both the first angle and the second angle, the at least one transmission characteristic including the beamform pattern; and cause the wireless transceiver to use both the response frequency and the beamform pattern to transmit the system information message to both the first UE device and the second UE device.

* * * * *